United States Patent [19]

Itakura et al.

[11] Patent Number: 5,434,437
[45] Date of Patent: Jul. 18, 1995

[54] SOLID STATE IMAGE SENSOR AND ITS DRIVING METHOD

[75] Inventors: Keijirou Itakura; Toshihide Nobusada, both of Ibaraki; Yasuyuki Toyoda, Minou; Yukio Saitoh, Uji; Noboru Kokusenya, Osaka; Ryouichi Nagayoshi, Koube; Hironori Tanaka, Takatsuki; Masayoshi Ozaki, Amagasaki, all of Japan

[73] Assignee: Matsushita Electronics Corporation, Osaka, Japan

[21] Appl. No.: 154,352

[22] Filed: Nov. 18, 1993

[30] Foreign Application Priority Data

Nov. 20, 1992 [JP] Japan .................................. 4-311577
Nov. 20, 1992 [JP] Japan .................................. 4-311578
Nov. 27, 1992 [JP] Japan .................................. 4-318241

[51] Int. Cl.⁶ ........................ H01L 27/14; H01L 31/00
[52] U.S. Cl. ................................ 257/231; 257/232; 257/233; 250/208.1; 327/515
[58] Field of Search ............... 257/222, 223, 229, 230, 257/231, 232, 233, 290, 291, 292; 307/311; 250/208.1

[56] References Cited

U.S. PATENT DOCUMENTS

| | | | |
|---|---|---|---|
| 4,009,333 | 2/1977 | Berger et al. | 257/232 X |
| 4,447,735 | 5/1984 | Horii | 257/232 X |
| 4,581,539 | 4/1986 | Kimata | 257/232 X |
| 4,810,901 | 3/1989 | Yamada | 257/232 X |

*Primary Examiner*—William Mintel
*Attorney, Agent, or Firm*—Willian Brinks Hofer Gilson & Lione

[57] ABSTRACT

The solid state image sensor of the invention comprises a plurality of photosensitive elements arranged in a matrix form, a vertical shift register disposed adjacent each column of the photosensitive elements and adapted to vertically transfer signal charges read from the corresponding photosensitive elements, a storage region for storing signal charges transferred by the vertical shift register and a horizontal shift register adapted to horizontally transfer signal charges read from the storage region, the above vertical shift register comprising units of 2n (n is a positive integer of not less than 3) transfer electrodes which are respectively independent.

11 Claims, 11 Drawing Sheets

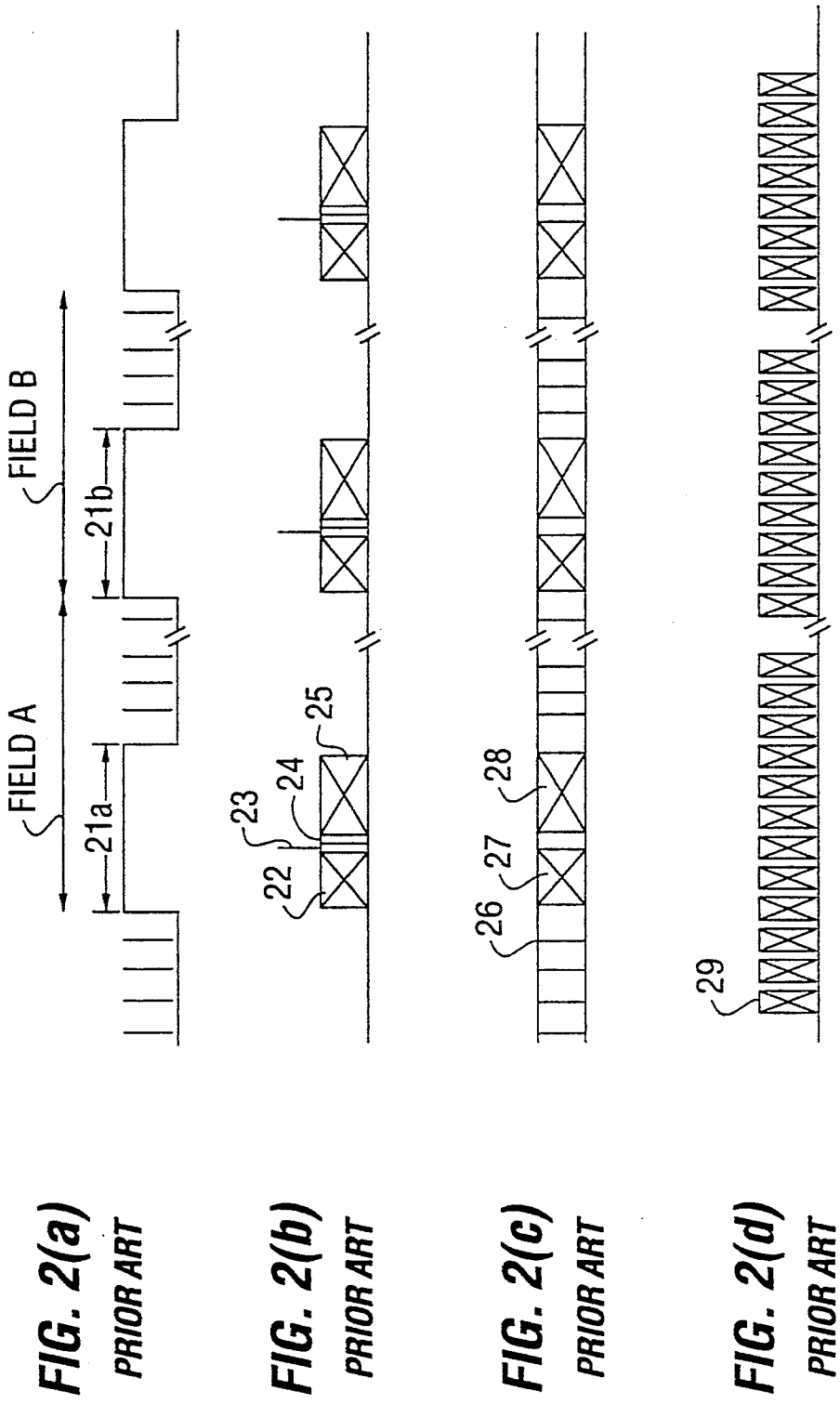

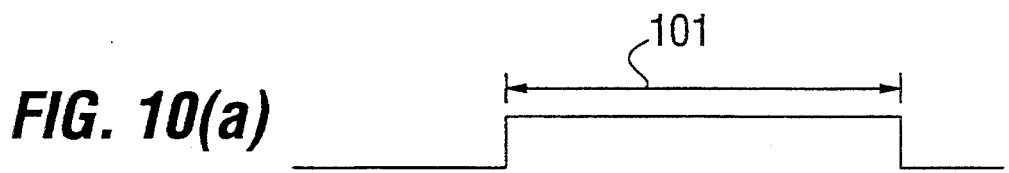
FIG. 10(a)
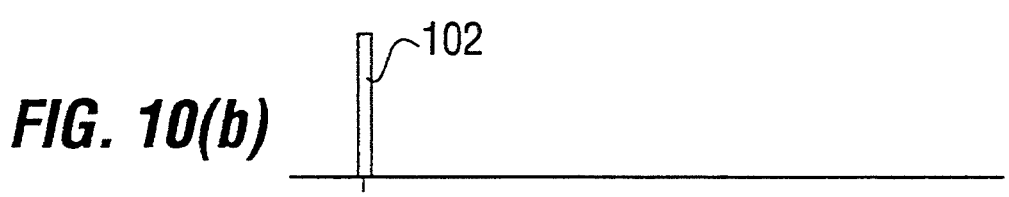
FIG. 10(b)
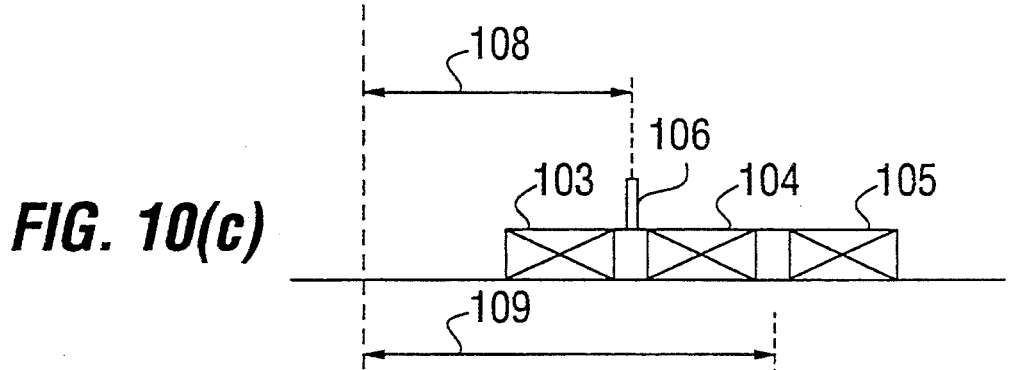
FIG. 10(c)
FIG. 10(d)
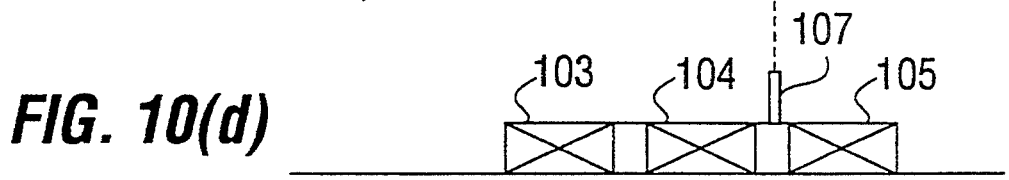
FIG. 10(e)
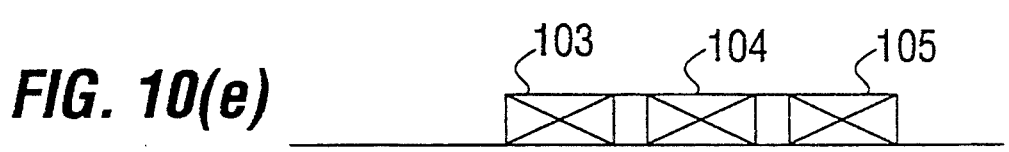
FIG. 10(f)

SOLID STATE IMAGE SENSOR AND ITS DRIVING METHOD

FIELD OF THE INVENTION

The present invention relates to a solid state image sensor including a charge-coupled device and a method of driving the same.

BACKGROUND OF THE INVENTION

Solid state image sensors are in common use of late as the imaging components of video cameras. Broadcasting cameras, in particular, include a solid state image sensor of the so-called frame interline transfer type which comprises an imaging region consisting of photosensitive elements and vertical shift registers, a storage region adapted to store signal charges, a horizontal shift register and a buffer amplifier so that the signal charges stored in photosensitive elements during an integrating time may be transferred at high velocity during the vertical blanking interval.

The conventional solid state image sensor and its driving method are now described in some detail. FIG. 1 is a schematic view showing a representative prior art solid state image sensor. As shown, its imaging region 1 comprises a multiplicity of photosensitive elements 5 arranged in a matrix form and a plurality of vertical shift registers 6 adapted to transfer signal charges read out of the corresponding photosensitive elements 5 in a vertical direction. The storage region 2 comprises a plurality of vertical shift registers 7 which store the signal charges transferred from the imaging region 1 and line-transfer these signal charges to a horizontal shift register 3. The buffer amplifier 4 is a means for outputting the signal charges transferred to said horizontal shift register 3.

In the above prior art solid state image sensor, each vertical shift register 6 has two independent transfer electrodes per picture element and transfers a block of signal charges by means of four transfer electrodes as an independent unit. Thus, the number of stages of said vertical shift register 6 is one-half of the number of photosensitive elements 5 in one vertical column and the number of stages of the vertical shift register 7 comprising the storage region 2 is equal to the number of stages of said vertical shift register 6.

The method for driving the prior art solid state image sensor illustrated in FIG. 1 is now explained. FIG. 2(a), FIG. 2(b), FIG. 2(c) and FIG. 2(d) show the timing charts of the driving method for the prior art solid state image sensor. Thus, FIG. 2(a) represents the composite synchronizing pulse, FIG. 2(b) represents the vertical transfer pulse applied to the vertical shift register 6, FIG. 2(c) represents the vertical transfer pulse applied to the storage region 2, and FIG. 2(d) represents the horizontal transfer pulse applied to the horizontal shift register 3. Referring, first, to FIG. 2(a), the driving method comprises reading out the signal charges from the photosensitive elements 5 in sets of two each during the vertical blanking interval 21a of field A and the vertical blanking interval 21b of field B and transferring the signal charges to the storage region 2 through the vertical shift register 6, and outputting them as a picture signal from the buffer amplifier 4. This sequence is explained in further detail taking field A as an example. First, as shown in FIG. 2(b), the unnecessary charges accumulated in the vertical shift register 6 are swept by a sweeping pulse 22 in the vertical blanking interval 21a. Then, the signal charges accumulated in every other photosensitive elements 5 in the vertical direction are read out to the vertical shift register 6 by a read pulse 23. Then, the signal charges in the vertically adjacent photosensitive elements 5 are mixed by a mixing pulse 24 and transferred to the storage region 2 by a transfer pulse 25. Thereafter, as shown in FIG. 2(c), the signal charges are horizontally line-transferred, during each horizontal transfer interval, from the vertical shift register 7 of the storage region 2 to the horizontal shift register 3 by a line transfer pulse 26. Then, the unnecessary charges remaining in the vertical shift register 7 are swept by a sweeping pulse 27 and signal charges from the imaging region 1 are freshly transferred by a transfer pulse 28. Thereafter, as shown in FIG. 2(d), the signal charges are transferred to the horizontal shift register 3 by a horizontal transfer pulse 29 and outputted as a picture signal from the buffer amplifier 4. Regarding field B, a picture signal is outputted from the buffer amplifier 4 in the same manner as above except that signal charges from a different combination of photosensitive elements 5 from that used for field A are dealt with.

Now, the method for driving the storage region of the prior art solid state image sensor is explained.

FIG. 3(a) is a waveform diagram showing the driving signal applied to the storage region of the prior art solid state image sensor and FIG. 3(b) is a potential profile of the storage region of the same solid state image sensor. These diagrams pertain to the 4-phase driving mode and the drive pulses represented by o1, o2, o3 and o4 in FIG. 3(a) are applied to four transfer electrodes per group of the storage region 2. The potential profile across a vertical section of the vertical shift register 7 of the storage region 2 can be represented as FIG. 3(b). Thus, signal charges 31 are transferred from A to B to C to D. The maximum signal quantity that can be dealt with in the vertical shift register 7 of the storage region 2 is defined by the potential well formed by drive pulses o2 and o3 as shown at A in FIG. 3(b).

However, in the above solid state image sensor wherein signal charges from all the photosensitive elements are transferred in a lump sum to the storage region 2, the maximum signal quantity that can be handled is limited to the quantity of signals which the vertical shift register 6 can manage to transfer in one operation so that the dynamic range is inevitably low.

Furthermore, in the above solid state image sensor, the signal charges of all the photosensitive elements cannot be transferred independently in the discrete form to the storage region 2 within the vertical blanking interval, such that no progressive-scan can be achieved.

SUMMARY OF THE INVENTION

The object of the invention is to provide a solid state image sensor having a broad dynamic range and a method of driving the same, to provide a solid state image sensor which can be used for both progressive-scan and interlaced-scan and a method of driving the same, and further to provide a method of driving a solid state image sensor which is free from a disparity in luminance between adjacent scan lines when the solid state image sensor is caused to discharge an electronic shutter function.

In one embodiment of a solid state image sensor according to the invention, the storage region has a capacity to independently store the signal charges of all the photosensitive elements, and the vertical shift register of the imaging region has 2n (where n is a positive integer of not less than 3) transfer electrodes per unit, which 2n transfer electrodes are respectively independent. In another embodiment of a solid state image sensor according to the invention, the storage region has a capacity to independently store the signal charges of all the photosensitive elements, and the number of stages of the vertical shift register in the imaging region is 1/n of the number of photosensitive elements constituting one vertical column. In still another embodiment of a solid state image sensor according to the invention, the transfer electrodes in the storage region are arranged in units of 8+4n (where n is a positive integer inclusive of 0) and each of the 8+4n transfer electrodes is independent of the others.

In one image sensor driving method of the invention, the signal charges of all the photosensitive elements in any of the above solid state image sensors are transferred for storage to the storage region in plural installments. Another driving method of the invention, as applied to any of the above-mentioned solid state image sensors, permits both progressive-scan and interlaced-scan according to the combination of transfer electrodes which is chosen for application of a driving pulse to the vertical shift register in the storage region. Still another driving method of the invention, as applied to any of the above solid state image sensors, realizes a high-velocity electronic shutter function without a disparity in luminance between adjacent scan lines on the displayed picture.

BRIEF DESCRIPTION OF THE DRAWINGS

FIG. 2(a), FIG. 2(b), FIG. 2(c) and FIG. 2(d) show the timing charts of the driving method for the prior art solid state image sensor;

FIG. 10(a), FIG. 10(b), FIG. 10(c), FIG. 10(d), FIG. 10(e) and FIG. 10(f) are timing charts of the first method for driving the solid state image sensor according to Embodiment 4 of the invention.

DETAILED DESCRIPTION OF THE PREFERRED EMBODIMENTS

Embodiment 1

Figure 4A:
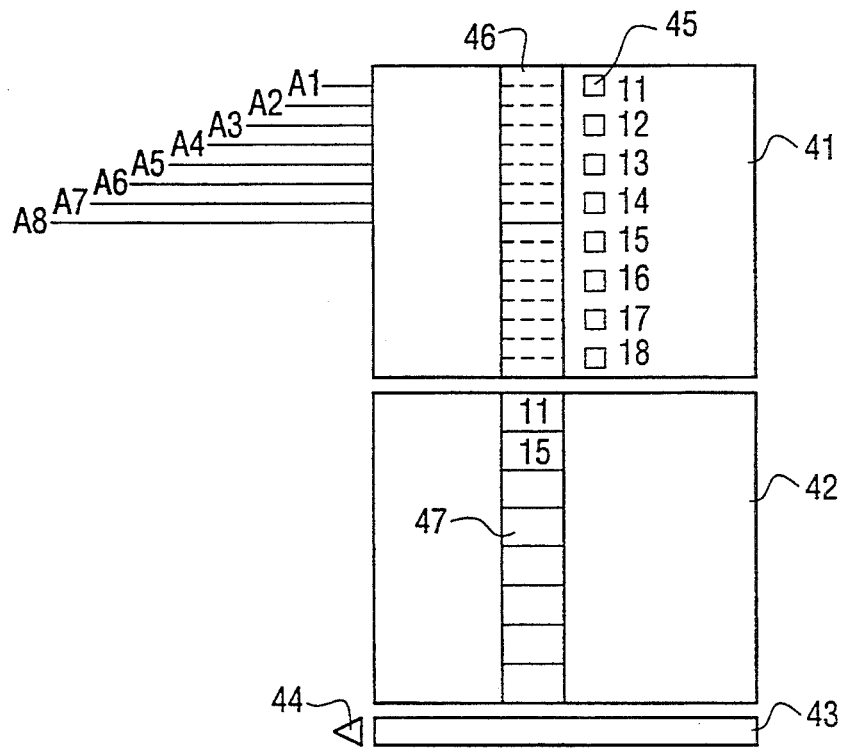
FIG. 4(a) and FIG. 4(b) are elementary diagrams illustrating the solid state image sensor according to Embodiment 1 of the invention and its driving method.
Figure 4B:
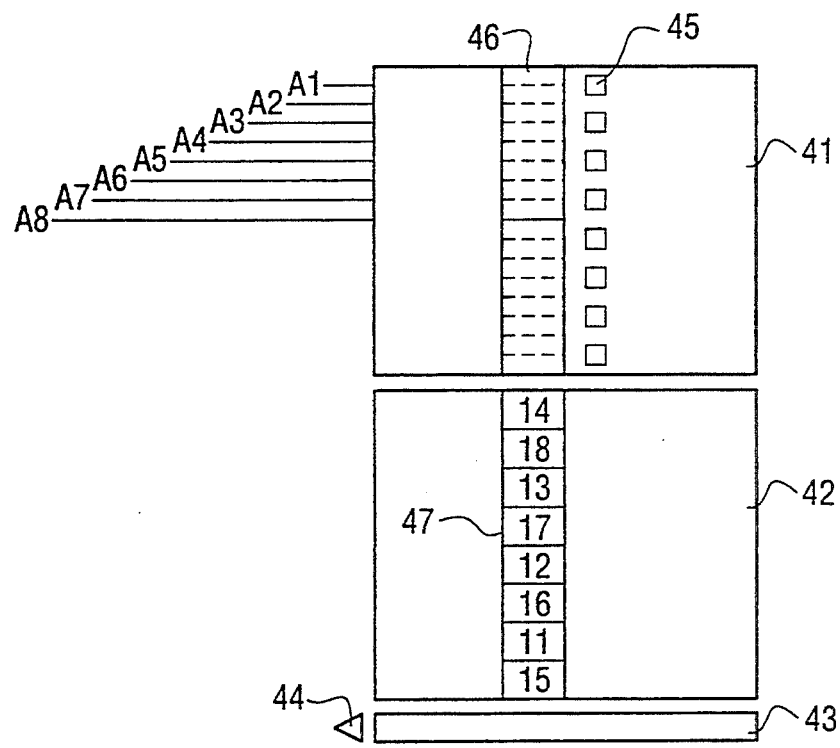

As shown in FIG. 4(a) and FIG. 4(b), this solid state image sensor comprises an imaging region 41, a storage region 42, a horizontal shift register 43 and a buffer amplifier 44. The imaging region 41 is comprised of a plurality of columns each comprising photosensitive elements 11, 12, 13, 14, 15, 16, 17 and 18 and a vertical shift register 46 adjacent to each of said columns, and the storage region 42 is comprised of vertical shift registers 47. Indicated by A1, A2, A3 A4, A5, A6, A7 and A8 are conductors for supplying a clock signal to the vertical shift registers 46.

FIG. 4(a) shows the solid state image sensor in which the transfer electrodes of the vertical shift register 46 are provided in units of 2n (n is a positive integer of not less than 3) and the 2n (n=4) transfer electrodes are respectively independent. For simplicity, the imaging region 41 is represented by a column 45 of 1 H×8 V photosensitive elements but actually it is implemented by a column of 948 H×486 V photosensitive elements.

The actions in the method of driving the above solid state image sensor are now explained. As shown in FIG. 4(a), signal charges are respectively read out from photosensitive elements 11 and 15 in the first place and these read signal charges are transferred by the vertical shift register 46 to the storage region 42. As this read-out and transfer operation is repeated 4 times, the signal charges of photosensitive elements 15, 11, 16, 12, 17, 13, 18, 14 are transferred to the storage region 42 where they are stored successively from the bottom. These stored signal charges are serially transferred to the horizontal shift register 43, outputted from the buffer amplifier 44 and subjected to digital signal processing to provide progressive-scan picture signals.

Then, the method for driving the above solid state image sensor on an interlaced-scan is described with reference to FIG. 5(a), FIG. 5(b), FIG. 5(c) and FIG. 5(d).

Figure 5A:
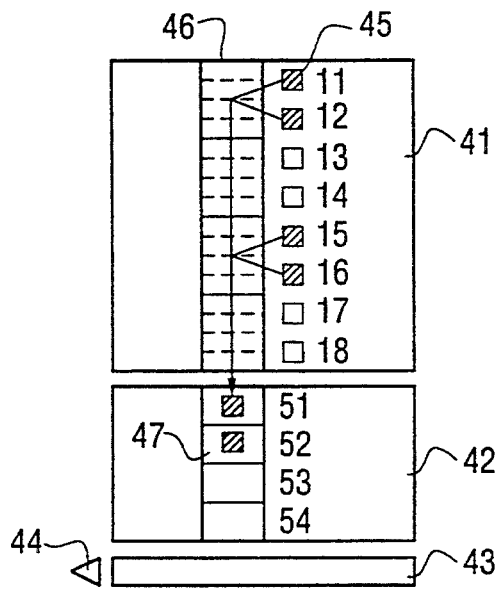
FIG. 5(a), FIG. 5(b), FIG. 5(c) and FIG. 5 (d) are diagrammatic representations of the method for driving the solid state image sensor according to Embodiment 1 of the invention on an interlaced-scan mode.
Figure 5B:
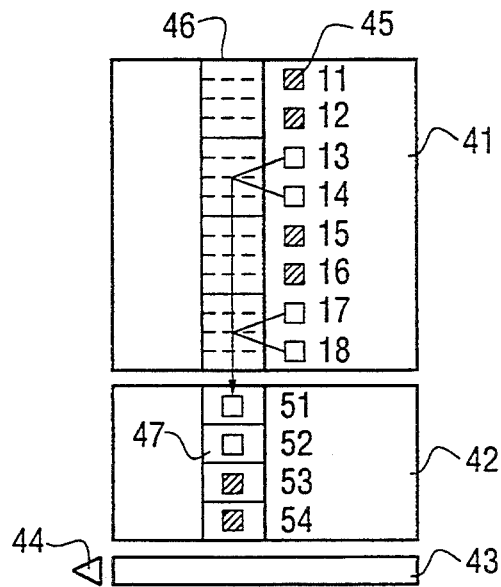

First, referring to field A, as shown in FIG. 5(a), signal charges are read out from photosensitive elements 11 and 12 and photosensitive elements 15 and 16 are respectively read out to the vertical shift register 46, mixed and transferred to the storage region 42. These signal charges are respectively stored in integrating stages 51 and 52 of the vertical shift register 47 constituting the storage region 42. Then, as shown in FIG. 5(b), signal charges are read out from photosensitive elements 13 and 14 and photosensitive elements 17 and 18, and these signals are respectively mixed and transferred to the storage region 42. Though these signal charges are transferred to the integrating stages 51 and 52, the signal charges previously stored in these stages 51 and 52 have already been transferred to the integrating stages 53 and 54 of the vertical shift register 47 constituting the storage region 42. When all the signal charges have been stored in the storage region 42, these signal charges are serially line-transferred to the horizontal shift register 43, outputted from the buffer amplifier 44 and subjected to digital signal processing to form a picture signal for field A. After all the signal charges in the vertical shift register 47 in the storage region 42 have been transferred through the horizontal shift register 44, a sweeping pulse is applied to sweep the unnecessary charges remaining in the vertical shift register 47.

Figure 5C:
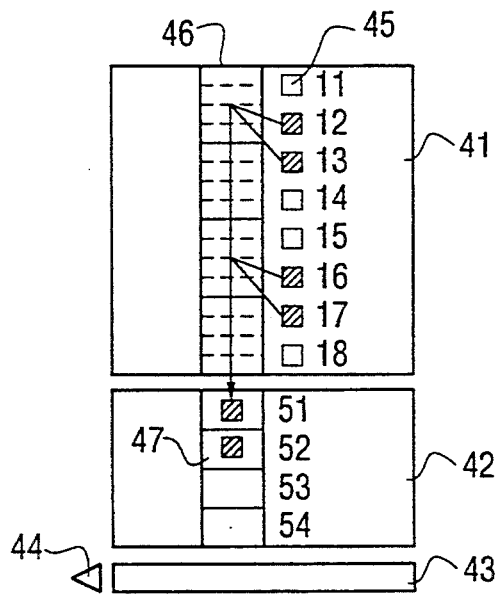
Figure 5D:
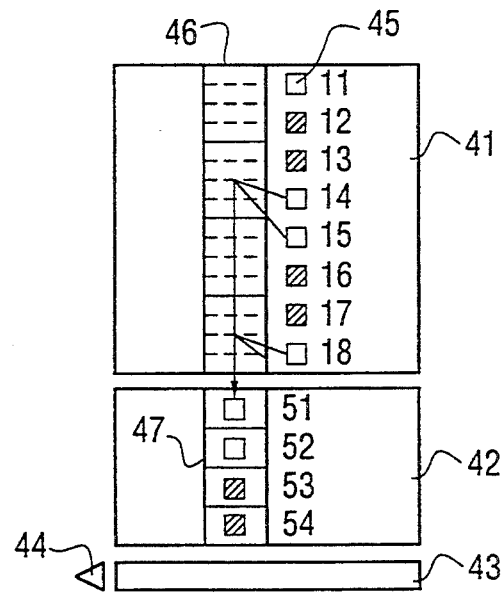

Then, in field B, as shown in FIG. 5(c), signal charges are read out from photosensitive elements 12 and 13 and photosensitive elements 16 and 17, which represent a second combination, in the column 45 to the vertical shift register 46, mixed and transferred to the storage region 42. Then, as shown in FIG. 5(d), photosensitive elements 14 and 15 and photosensitive elements 18 and 19 (not shown) are read to the vertical shift register 46, mixed and transferred to the storage region 42. Though these signal charges are thus transferred to the integrating stages 51 and 52, the signal charges previously stored in these integrating stages 51 and 52 have already been transferred to integrating stages 53 and 54. When all the signal charges have been thus stored in the storage region 42, these signals are serially line-transferred to the horizontal shift register 43, outputted from the buffer amplifier 44 and subjected to digital signal processing to make a picture signal. Compared with the conventional transfer electrodes in sets of four, the above construction and driving method afford an increased maximum signal quantity that can be handled by the vertical shift register 46 and a commensurate gain in dynamic range.

Embodiment 2

Figure 6:
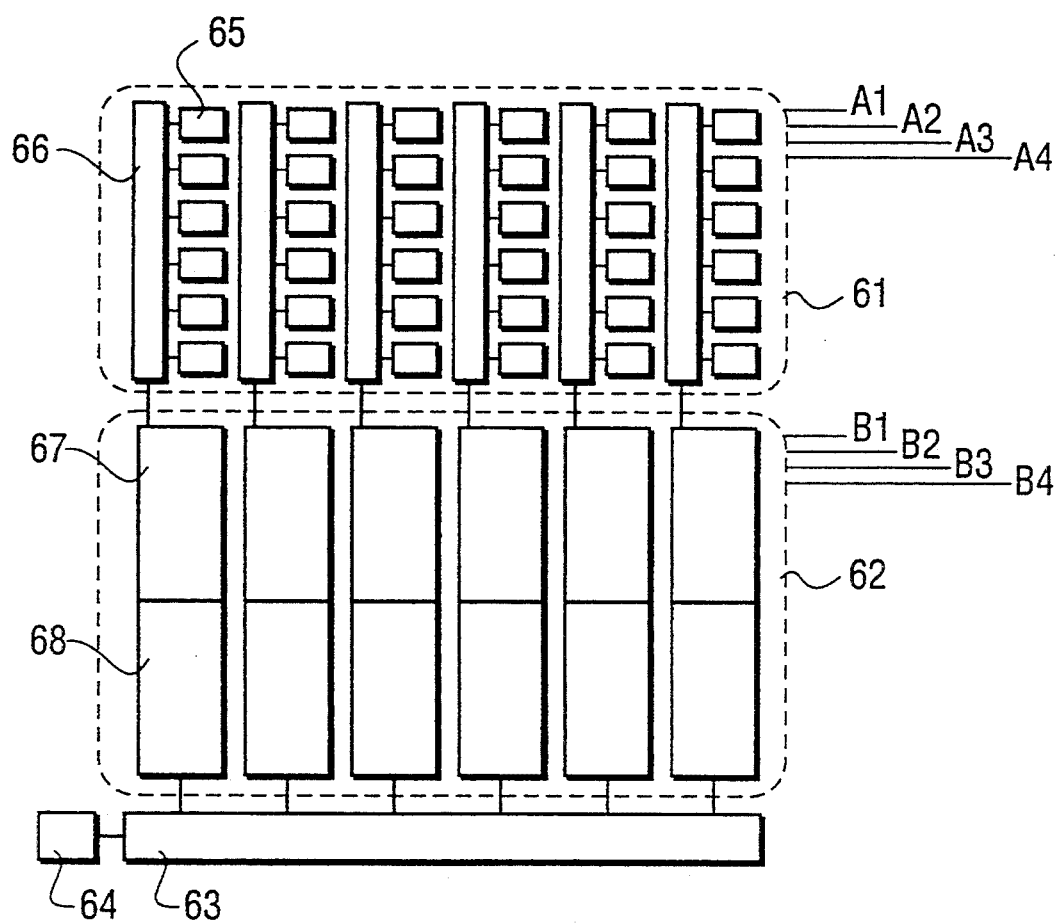
FIG. 6 is an elementary diagram showing the solid state image sensor according to Embodiment 2 of the invention.

As shown in FIG. 6, this solid state image sensor comprises an imaging region 61, a storage region 62, a horizontal shift register 63 and a buffer amplifier 64. The imaging region 61 is comprised of columns 65 of photosensitive elements and a vertical shift register 66 disposed adjacent each of the columns, and the storage region 62 is comprised of an upper storage area 67 and a lower storage area 68. Indicated by A1, A2, A3 and A4 are conductors for supplying clock pulses to the transfer stages of the vertical shift register 66. Conductors for supplying clock pulses to the vertical shift register in the storage region 62 are indicated by B1, B2, B3 and B4. For simplicity, the imaging region 61 is represented by columns 65 of 6 H×6 V photosensitive elements but actually it is implemented by columns 65 of 948 H×486 V photosensitive elements, and the corresponding vertical shift registers 66 in the imaging region comprise 948 H×243 V elements. The storage region 62 consists of 948 H×486 V elements and, for simplicity of explanation, is divided into an upper storage area 67 and a lower storage area 68.

Figure 7A:
FIG. 7(a), FIG. 7(b), FIG. 7(c) and FIG. 7(d) are timing charts of the method for driving the solid state image sensor according to Embodiment 2 of the invention.
Figure 7B:
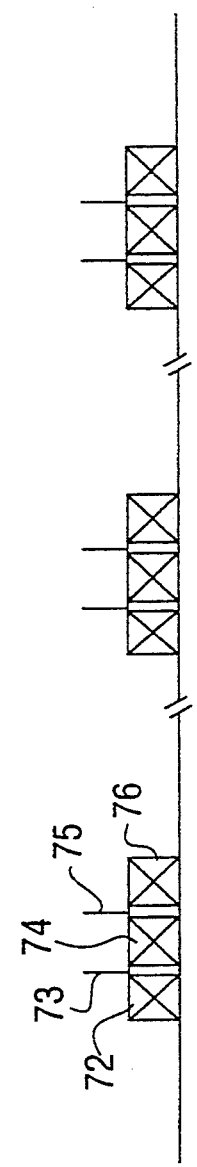
Figure 7C:
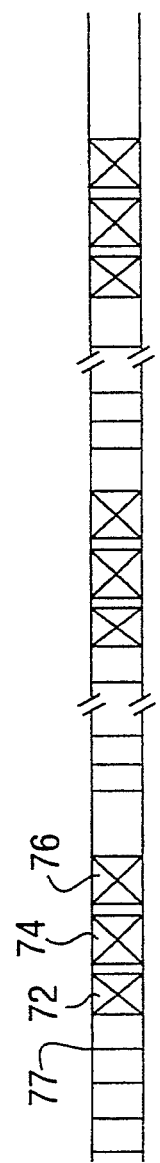
Figure 7D:
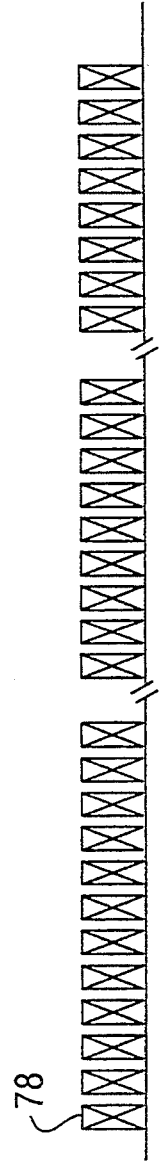

The actions and functions of the above solid state image sensor are now explained with reference to the timing charts shown in FIG. 7(a), FIG. 7(b), FIG. 7(c) and FIG. 7(d). FIG. 7(a) represents the composite synchronizing pulse, FIG. 7(b) represents the transfer pulse for the vertical shift register, FIG. 7(c) represents the transfer pulse for the vertical shift register in the storage region and FIG. 7(d) represents the transfer pulse for the horizontal shift register.

First, signal charges for one picture frame are transferred for storage from the imaging region 61 to the storage region 62 during the vertical blanking interval 71 shown in FIG. 7(a). Thus, as shown in FIG. 7(b), the unnecessary charges stored in the vertical shift register 66 are swept by a sweeping pulse 72 and, then, the signal charges accumulated in the even-number photosensitive elements of the photosensitive element column 65 are read by a first read pulse 73 to the vertical shift register 66. The signal charges read out to the vertical shift register 66 are transferred by a first transfer pulse 74 to the upper storage area 67. Then, the signal charges accumulated in the odd-number photosensitive elements of the photosensitive element column 65 are read out by a second read pulse 75 to the vertical shift register 66. The signal charges read out to the vertical shift register 66 are transferred by a second transfer pulse 76 to the upper storage area 67 and, at the same time, the signal charges accumulated in the upper storage area are transferred to the lower storage area 68. The waveforms, shown in FIG. 7(c), represent the clock signals applied to the storage region 62. Thus, the unnecessary charges in the vertical shift register of the storage region are first swept by the transfer pulse 72 and, thereafter, the signal charges are shifted by the first transfer pulse 74 and second transfer pulse 76 within the storage region 62. After signal charges in all the photosensitive elements 65 have been stored in the storage region 62, the signal charges in the storage region 62 are transferred one column after another to the horizontal shift register 63 by a line transfer pulse 77, shifted by a horizontal transfer pulse 78, shown in FIG. 7(d), within the horizontal shift register 63 and outputted from the buffer amplifier 64.

In the above construction and driving method, the number of stages of the storage region 62 is equal to the number of photosensitive elements per column and the number of stages of the vertical shift register 66 in the imaging region 61 is equal to ½ of the number of stages of the vertical shift register in the storage region 62. The signal charges accumulated in the column of photosensitive elements 65 are transferred to the storage region in two installments within the vertical blanking interval, even-number photosensitive elements first and odd-number photosensitive elements next. As signal charges in all the photosensitive elements are transferred to the storage region 62, a progressive-scan becomes feasible and, moreover, the signal quantity that can be handled is increased to expand the dynamic range.

While the number of transfer stages in the storage region is twice the number of stages in the vertical shift register of the imaging region in the above description, the same effect can be achieved when the former is 3 times as great as the latter.

Embodiment 3

Figure 8:
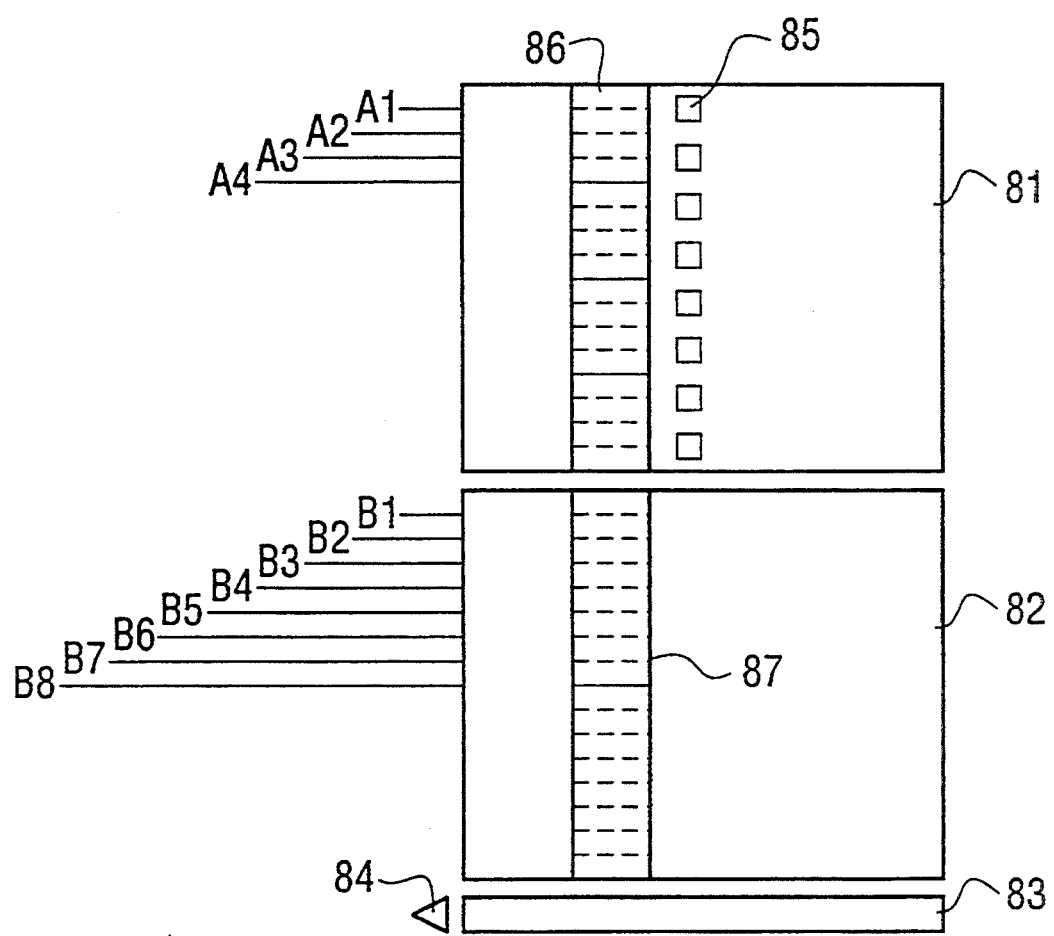
FIG. 8 is an elementary diagram illustrating the solid state image sensor according to Embodiment 3 of the invention and its driving method.

As shown in FIG. 8, this solid state image sensor comprises an imaging region 81, a storage region 82, a horizontal shift register 83 and a buffer amplifier 84. The imaging region 81 comprises columns of photosensitive elements 85 and a vertical shift register 86 disposed adjacent each of said columns, and the storage region 82 comprises the corresponding vertical shift registers 87. The symbols A1, A2, A3 and A4 represent conductors for supplying clock pulses to the vertical shift registers 86 and B1, B2, B3, B4, B5, B6, B7 and B8 represent conductors for supplying clock pulses to the vertical shift register of the storage region 82.

FIG. 8 shows an image sensor construction in which transfer electrodes in the vertical shift register 87 of the storage region 82 are provided in units of 8+4n (n is a positive integer inclusive of 0) transfer electrodes and these 8+4n transfer electrodes (n=0) are respectively independent. For simplicity, the imaging region 81 is represented by 1 H×8 V photosensitive elements 85 but actually it is implemented by 948 H×486 V photosensitive elements.

To perform a progressive-scan using the above solid state image sensor, signal charges are read out from all the photosensitive elements and stored in the storage region 82 in the first place and these signal charges are then line-transferred from the storage region 82 to the horizontal shift register 83 and shifted within the horizontal shift register 83. The picture signal output is available from the buffer amplifier 84. In this connection, the increased number of transfer electrodes in the vertical shift register 87 of the storage region 82 provides for a greater maximum signal quantity that can be handled and, hence, a broader dynamic range.

The operation to achieve an interlaced-scan with the above solid state image sensor is now described. First, signal charges are read out from groups of vertically adjacent two photosensitive elements to the vertical shift register 86 and transferred to the storage region 82 comprising groups of eight transfer electrodes. The signal charges stored in the storage region 82 are serially line-transferred to the horizontal shift register 83 and, as a result, a picture signal constituting field A is outputted via the buffer amplifier 84. Then, signal charges are read out from the other groups of photosensitive elements to the vertical shift register 86 and transferred to the storage region 82. These signal charges are serially line-transferred to the horizontal shift register 83 and a picture signal constituting field B is outputted via the buffer amplifier 84. An interlaced-scan can also be achieved by applying the same driving signal to groups of conductors B1 and B2, B3 and B4, B5 and B6, and B7 and B8 for supplying clock pulses to the transfer electrodes in the storage region 82.

The transfer of signal charges within the storage region 82 is now described.

Figure 9A:
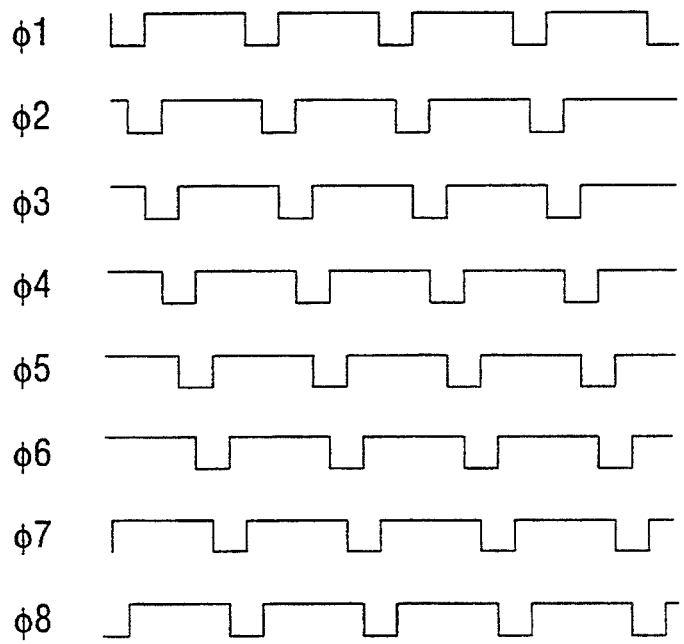
FIG. 9(a) and FIG. 9 (b) are timing charts of the method for driving the solid state image sensor according to Embodiment 3 of the invention.
Figure 9B:
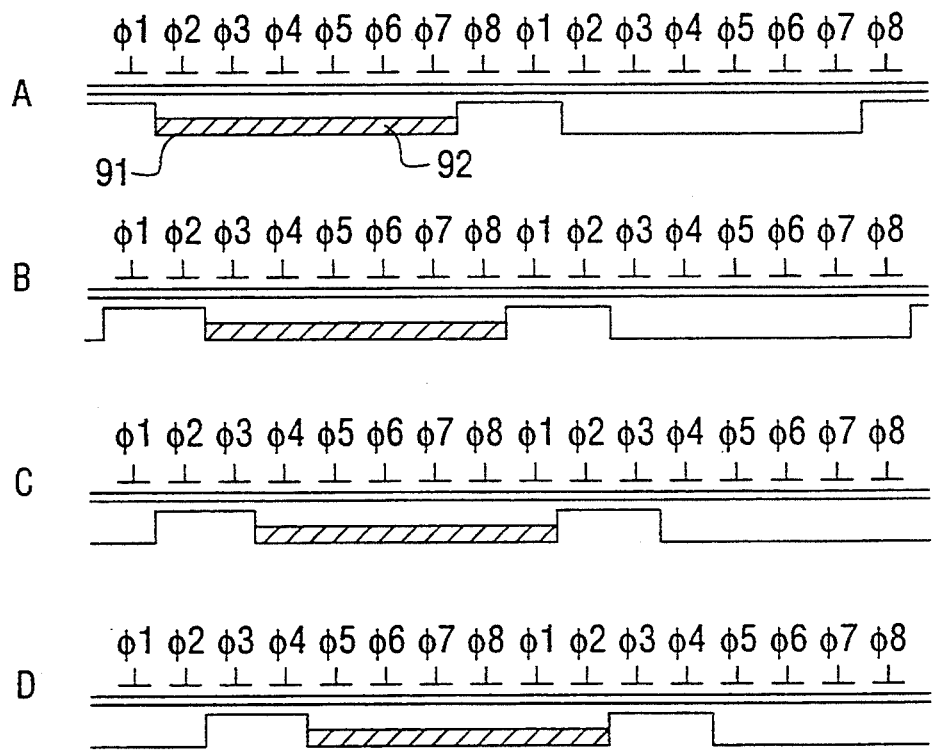

FIG. 9(a) shows the clock signals applied to the transfer electrodes of the storage region 82 and FIG. 9(b) is a potential profile of the storage region 82. As shown in FIG. 9(a), clock pulses o1, o2, o3, o4, o5, o6, o7, and, o8, respectively, are applied to eight transfer electrodes of the vertical shift register 87 of the storage region 82 to transfer the signal charges within the storage region 82. In this connection, the potential well 91 moves from A through D in FIG. 9(b) to shift the signal charge 92. First, as shown in FIG. 9(b), the signal charge 92 is accommodated in the potential well 91 formed by the clock pulses applied to a group of eight transfer electrodes. This potential well 91 then moves to B to C to D according to the clock pulses to thereby transfer the signal charge 92.

The above construction and driving method not only insure an improved dynamic range in progressive-scan but provide for an interlaced-scan signal output by a mere change of the driving pulse applied to the transfer electrodes of the storage region 82, without provision of an external complicated digital signal processor.

While the transfer electrodes of the storage region 82 are provided in groups of 8 in the above description, the same effect can be achieved by using transfer electrodes in groups of 8+4n (n is a positive integer inclusive of 0), such as groups of 12 or 16.

Embodiment 4

Embodiment 4 pertains to a driving method for achieving an electronic shutter function with a solid state image sensor comprising an imaging region comprising photosensitive elements and vertical shift register, a storage region for accumulating signal charges from the imaging region, a horizontal shift register for horizontal transfer of signal charges from said storage region, and a buffer amplifier.

FIG. 10(a), FIG. 10(b), FIG. 10(c), FIG. 10(d), FIG. 10(e) and FIG. 10(f) are the timing charts of a first driving method for achieving an electronic shutter function with the solid state image sensor of the invention. FIG. 10(a) represents the composite synchronizing pulse, FIG. 10(b) represents the photosensitive element reset pulse for an electronic shutter function, FIG. 10(c) represents the vertical transfer pulse applied to the vertical shift register for reading signal charges for transfer from the even-number photosensitive elements, FIG. 10(d) represents the vertical transfer pulse applied to the vertical shift register of the imaging region and FIG. 10(e) and FIG. 10(f) represent the vertical transfer pulse applied to the vertical shift register of the storage region.

The first driving method for an electronic shutter function is now described with reference to the solid state image sensor shown in FIG. 6.

First, as shown in FIG. 10(b), a reset pulse 102 for initiating the electronic shutter function is applied during the vertical blanking interval 101 to reset the charges accumulated in the photosensitive elements 65. By this reset pulse 102, charges accumulated in all the photosensitive elements 65, irrespective of even-number or odd-number elements, are released. The reset pulse 102 serves as an integration start signal for an electronic shutter function, and at this moment the photosensitive elements 65 (both even-number and odd-number elements) start accumulating electric charges anew. Then, as shown in FIG. 10(c), a sweeping pulse 103 sweeps the unnecessary charges remaining in the vertical shift register 66 and with a lag time 108 after the reset pulse 102, signal charges are read out from the odd-number photosensitive elements 65 to the vertical shift register 66 by a first read pulse 106. The read signal charges are transferred to the storage region 62 by an odd-number transfer pulse 104. Then, as shown in FIG. 10(d), a sweeping pulse 103 sweeps the unnecessary charges remaining in the vertical shift register 66. Then, with a lag time 109 from the reset pulse 102, a second read pulse 107 is applied so as to read signal charges from the even-number photosensitive elements 65 to the vertical shift register 66. The read signal charges are transferred to the storage region 62 by an even-number transfer pulse 105. The signal charges thus transferred to the storage region 62 are shifted within the storage region 62 by a series of pulses as shown in FIG. 10(e) and FIG. 10(f). However, in the first driving method described above, because of a large difference between the lag time 108 and lag time 109, there may occur a difference in luminance between field A and field B. The second driving method for an electronic shutter function which overcomes the above problem is now described with reference to the solid state image sensor construction shown in FIG. 6.

FIG. 11(a), FIG. 11(b), FIG. 11(c), FIG. 11(d) and FIG. 11(e) are the timing charts of the second driving method for electronic shutter function with the solid state image sensor of the invention.

Figure 11A:
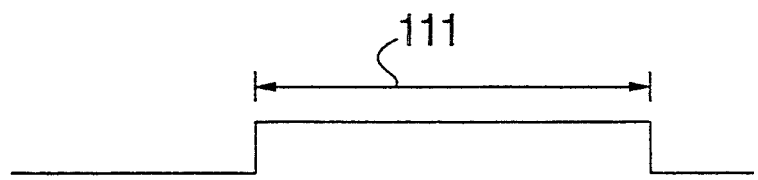
FIG. 11(a), FIG. 11(b), FIG. 11(c), FIG. 11(d) and FIG. 11(e) are timing charts of the second method for driving the solid state image sensor according to Embodiment 4 of the invention.
Figure 11B:
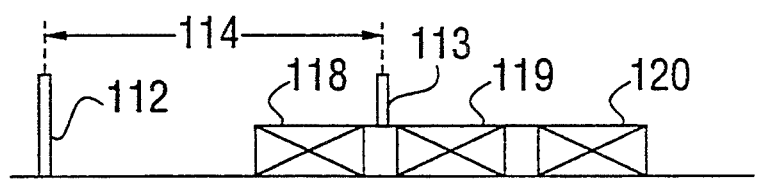

First, within the vertical blanking interval 111, a first reset pulse 112 is applied to the photosensitive elements 65 as shown in FIG. 11(b) to reset the charges previously accumulated in the photosensitive elements 65, which then starts accumulating charges anew. Then a sweep pulse 118 sweeps the unnecessary charges from the vertical shift register 66. Then, with a lag time 114 from the first reset pulse 112, a first read pulse 113 is applied so as to read signal charges from the odd-number photosensitive elements 65. The read signal charges are transferred to the storage region 62 by a transfer pulse 119 and, as a consequence, the picture signal for field A is outputted.

Figure 11C:
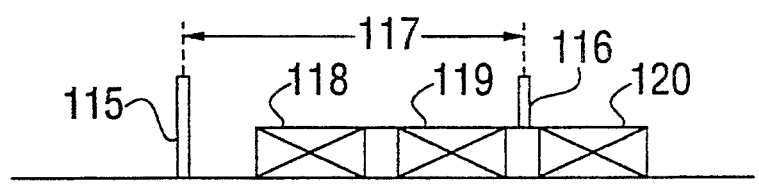
Figure 11D:
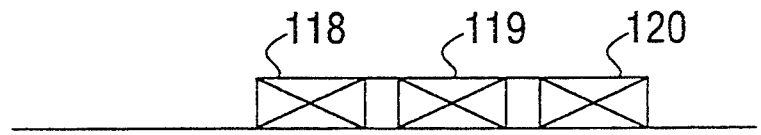
Figure 11E:
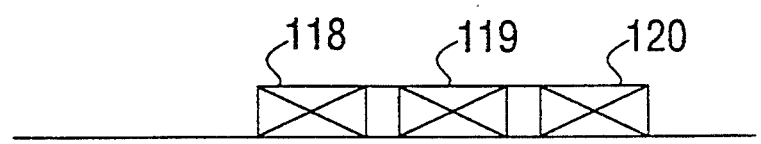

Then, as shown in FIG. 11(c), a second reset pulse 115 resets the charges accumulated in the photosensitive elements 65, whereupon the photosensitive elements 65 start accumulating charges anew. Then, a sweep pulse 118 sweeps the unnecessary charges in the vertical shift register 66. Then, with a lag time 117 from the second reset pulse 115, a second read pulse 116 is applied so as to read signal charges from the even-number photosensitive elements 65. The read signal charges are transferred to the storage region 62 by a transfer pulse 120 and, as a result, a picture signal for field B is outputted.

As independent reset pulses are provided for field A and field B, respectively, in this manner, the integrating time for photosensitive elements 65 for field A and that for field B can be freely set so that the luminance of each field can be adjusted independently of the other. Furthermore, by equalizing the lag time 114 and lag time 117, any disparity in luminance between adjacent scan lines can be eliminated so that a subject of homogeneous luminance can be displayed without a disparity in luminance between adjacent scan lines and, hence, a picture of high quality can be obtained.

The same effect can be obtained by applying high-voltage pulses between the image sensor semiconductor substrate and the photosensitive elements 65 as said first reset pulse and second reset pulse.

Figure 1:
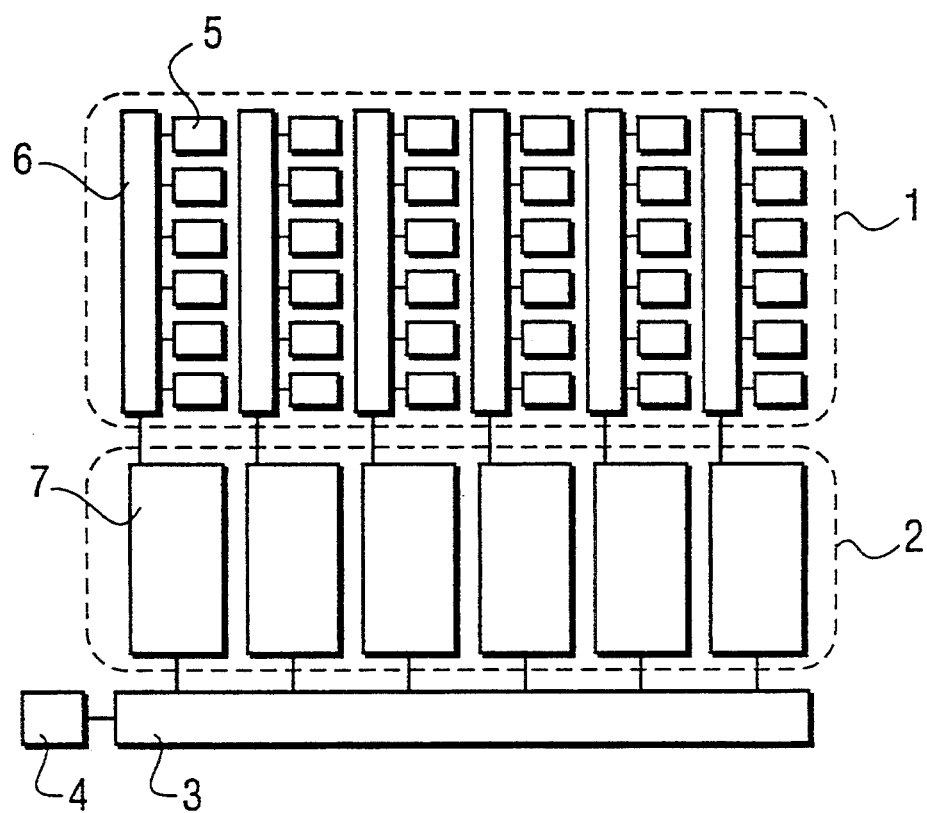
FIG. 1 is a schematic view showing the prior art solid state image sensor.
Figure 3A:
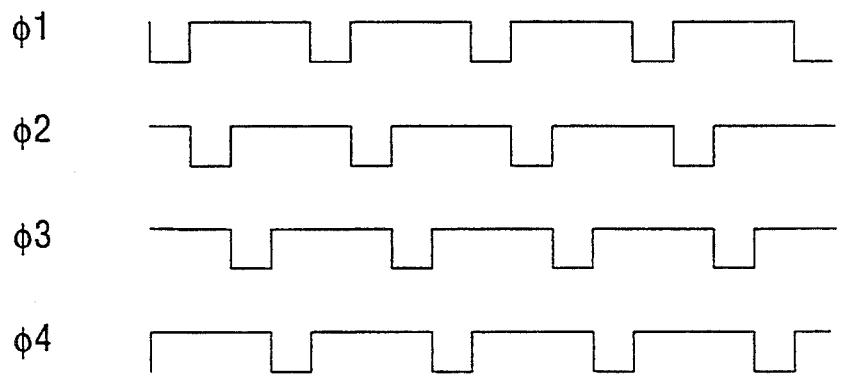
FIG. 3(a) is a waveform diagram showing the driving signal applied to the storage region of the prior art solid state image sensor.
Figure 3B:
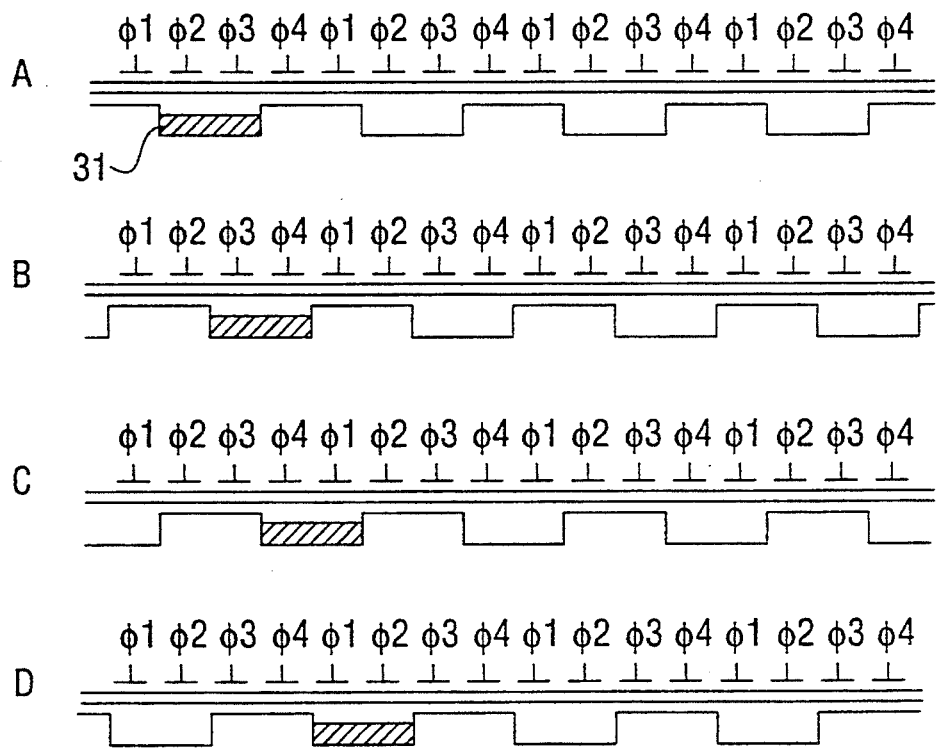
FIG. 3(b) is a potential profile of the storage region of the same solid state image sensor.

Furthermore, the second driving method described above for electronic shutter function is not only applicable to the solid state image sensor shown in FIG. 6 but can be equally applied to the prior art solid state image sensor shown in FIG. 1 or any solid state image sensor of the FIT structure, invariably with the same result.

We claim:

1. A solid state image sensor comprising a plurality of photosensitive elements arranged in a matrix form, a vertical shift register disposed adjacent each column of said photosensitive elements and adapted to vertically transfer signal charges read from the corresponding photosensitive elements, a storage region for storing signal charges transferred by said vertical shift register and a horizontal shift register adapted to horizontally transfer signal charges read from said storage region, said vertical shift register comprising units of 2n (n is a positive integer of not less than 3) transfer electrodes and said 2n transfer electrodes being respectively independent.

2. A solid state image sensor comprising a plurality of photosensitive elements arranged in a matrix form, a vertical shift register disposed adjacent each column of said photosensitive elements and adapted to vertically transfer signal charges read from the corresponding photosensitive elements, a storage region for storing signal charges transferred by said vertical shift register and a horizontal shift register adapted to horizontally transfer signal charges read from said storage region, said storage region having a capacity to store signal charges from all the photosensitive elements independently and the number of transfer stages of said vertical shift register being equal to 1/n (n is an integer of not less than 2 and is not more than the vertical number of said photosensitive elements) of the vertical number of said photosensitive elements.

3. A solid state image sensor comprising a plurality of photosensitive elements arranged in a matrix form, a vertical shift register disposed adjacent each column of said photosensitive elements and adapted to vertically transfer signal charges read from the corresponding photosensitive elements, a storage region for storing signal charges transferred by said vertical shift register and a horizontal shift register adapted to horizontally transfer signal charges read from said storage region, said storage region comprising units of 8+4n (n is a positive integer inclusive of 0) transfer electrodes and said 8+4n transfer electrodes being respectively independent.

4. A method for driving a solid state image sensor which comprises a step of reading signal charges from each column of photosensitive elements arranged in a matrix form to a vertical shift register comprising units of 2n (n is a positive integer of not less than 3) transfer electrodes which are respectively independent, a step of transferring said signal charges by n-phase driving through the vertical shift register to a storage region, a step of transferring the signal charges accumulated in said storage region to a horizontal shift register and a step of shifting said signal charges within said horizontal shift register for outputting.

5. A method for driving a solid state image sensor which comprises a step of reading signal charges from each column of photosensitive elements arranged in a matrix form to a vertical shift register comprising units of 2n (n is a positive integer of not less than 3) transfer electrodes which are respectively independent, a step of transferring said signal charges to a storage region, a step of transferring signal charges from all the photosensitive elements to a horizontal shift register after repetition of the first-mentioned two steps, and a step of transferring said signal charges within said horizontal shift register for outputting.

6. A method for driving a solid state image sensor which comprises a step of reading signal charges from groups of two vertically adjacent photosensitive elements among a plurality of photosensitive elements arranged in a matrix form each as a unit to a vertical shift register comprising 2n (n is a positive integer of not less than 3) transfer electrodes which are respectively independent, a step of transferring said signal charges to a storage region, a step of reading signal charges from groups of two photosensitive elements different from the first-mentioned groups to the vertical shift register for transfer to the storage region, a step of transferring the signal charges accumulated in said storage region to a horizontal shift register and a step of transferring said signal charges within said horizontal shift register for outputting.

7. A method for driving a solid state image sensor which comprises a step of reading signal charges from a cohort of a plurality of photosensitive elements arranged in a matrix form, a step of transferring said signal charges to a storage region, a step of transferring the signal charges accumulated in said storage region after completion of transfer and storage of signal charges from all the photosensitive elements by repetition of the above-mentioned two steps, and a step of transferring said signal charges within said horizontal shift register for outputting.

8. A method for driving a solid state image sensor comprising a step of reading signal charges from each column of a plurality of photosensitive elements arranged in a matrix form to a vertical shift register, a step of transferring said signal charges for storage to a storage region comprising units of 8+4n (n is a positive integer inclusive of 0) transfer electrodes which are respectively independent, a step of transferring the signal charges accumulated in said storage region to a horizontal shift register, and a step of transferring said signal charges within said horizontal shift register for outputting.

9. The method for driving a solid state image sensor according to claim 8 characterized in that the signal charges are transferred by driving the transfer electrodes of said storage region with an 8+4n phase driving signal.

10. A method for driving a solid state image sensor characterized in that a first photosensitive element reset pulse for resetting odd-number photosensitive elements in each column of photosensitive elements arranged in a matrix form on a semiconductor substrate prior to a first read pulse for reading signal charges from said odd-number photosensitive elements and before application of a sweeping pulse and a second photosensitive element reset pulse for resetting even-number photosensitive elements prior to a second read pulse for reading signal charges from said even-number photosensitive elements and before application of a sweeping pulse are applied at independent timings.

11. The method for driving a solid state image sensor according to claim 10 characterized in that a lag time between said first photosensitive element reset pulse and said first read pulse is equal to a lag time between said second photosensitive element reset pulse and said second read pulse.

* * * * *